(12) United States Patent
Damus et al.

(10) Patent No.: US 9,853,744 B2
(45) Date of Patent: Dec. 26, 2017

(54) SYSTEMS AND METHODS FOR TRANSMITTING DATA FROM AN UNDERWATER STATION

(71) Applicant: Hadal, Inc., Alameda, CA (US)

(72) Inventors: Robert S. Damus, Alameda, CA (US); Richard J. Rikoski, Alameda, CA (US)

(73) Assignee: HADAL, INC., Oakland, CA (US)

( * ) Notice: Subject to any disclaimer, the term of this patent is extended or adjusted under 35 U.S.C. 154(b) by 675 days.

(21) Appl. No.: 13/744,143

(22) Filed: Jan. 17, 2013

(65) Prior Publication Data

US 2013/0187787 A1   Jul. 25, 2013

Related U.S. Application Data

(60) Provisional application No. 61/587,486, filed on Jan. 17, 2012.

(51) Int. Cl.
*H04B 13/02* (2006.01)
(52) U.S. Cl.
CPC .................... *H04B 13/02* (2013.01)
(58) Field of Classification Search
CPC ..................................................... H04B 13/02
USPC ....................................................... 340/850
See application file for complete search history.

(56) References Cited

U.S. PATENT DOCUMENTS

| | | | |
|---|---|---|---|
| 2003/0186726 A1* | 10/2003 | Akita | H04B 7/0608 455/562.1 |
| 2004/0022129 A1* | 2/2004 | McGeever, Jr. | 367/128 |
| 2004/0043906 A1* | 3/2004 | Heath et al. | 507/200 |
| 2007/0012821 A1* | 1/2007 | Buehler | 244/171.9 |
| 2007/0030856 A1* | 2/2007 | Cooke et al. | 370/401 |
| 2008/0250998 A1* | 10/2008 | Bruengger et al. | 114/244 |
| 2009/0094401 A1* | 4/2009 | Larson et al. | 710/316 |
| 2010/0000820 A1* | 1/2010 | Huang et al. | 181/200 |
| 2011/0073707 A1* | 3/2011 | Bossert et al. | 244/63 |
| 2011/0120719 A1* | 5/2011 | Soane et al. | 166/308.1 |
| 2012/0069704 A1* | 3/2012 | Cambois | 367/21 |
| 2012/0095629 A1* | 4/2012 | Fjellstad et al. | 701/21 |
| 2012/0137949 A1* | 6/2012 | Vosburgh | B63G 8/001 114/330 |

* cited by examiner

*Primary Examiner* — Amine Benlagsir
(74) *Attorney, Agent, or Firm* — White & Case LLP

(57) ABSTRACT

The systems and methods described herein include releasable storage devices that can surface with data. The devices include data storage, an antenna, battery and means to propel the device to the surface or into the atmosphere. In certain embodiments, it is a USB memory stick, a battery, suitable buoyancy, and an antenna. In certain embodiments, the systems and methods described herein include a rocket to boost the system out of the water to a higher altitude. Once the system is airborne, it can transmit data to a ship or satellite via radio communications, via other line of site methods such as optical, or may be captured by an aircraft such as a UAV.

28 Claims, 6 Drawing Sheets

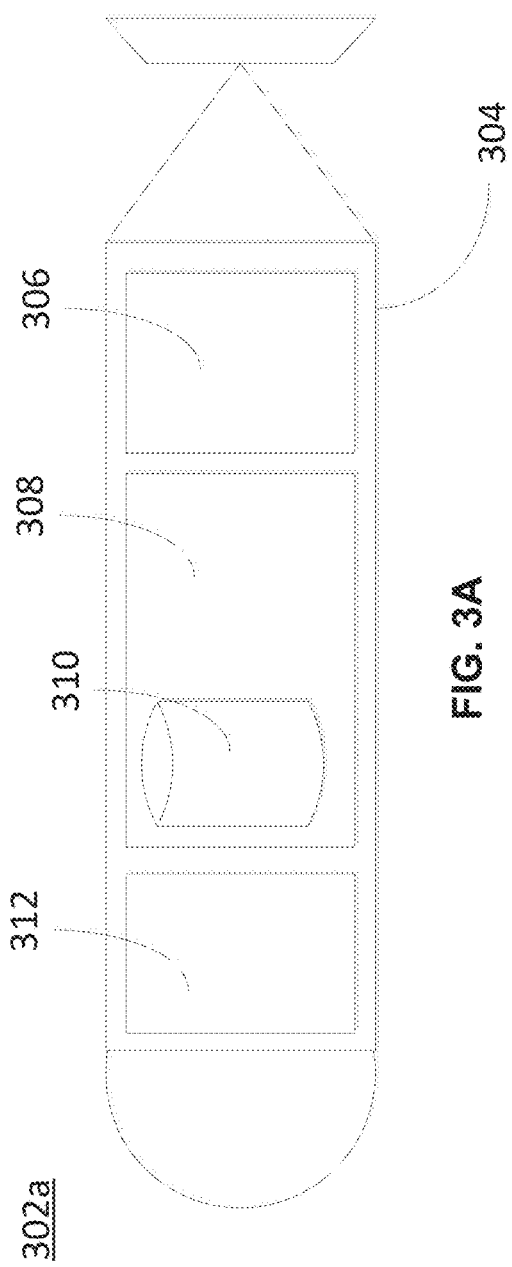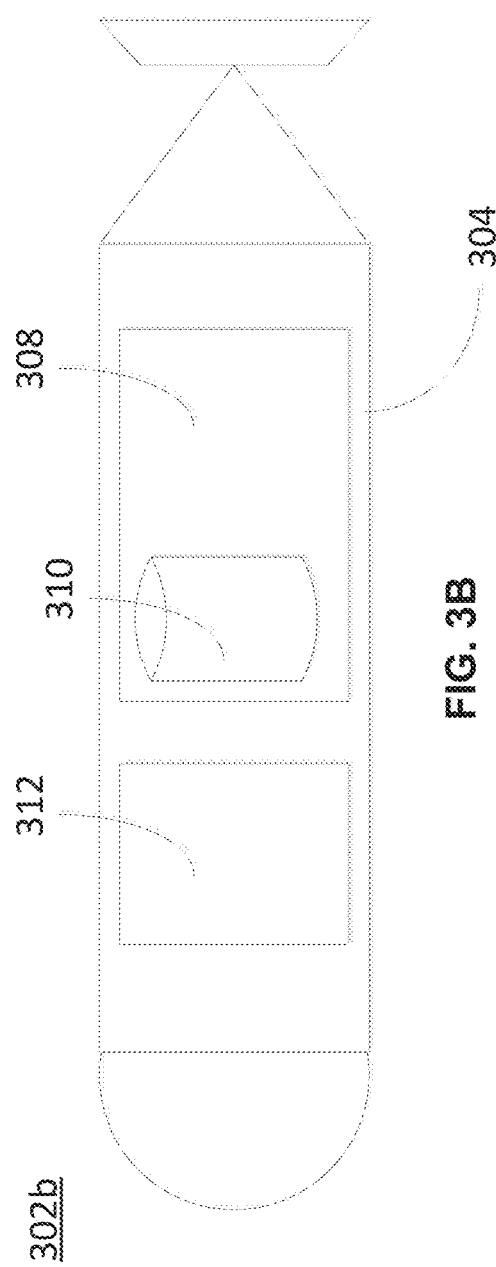

SYSTEMS AND METHODS FOR TRANSMITTING DATA FROM AN UNDERWATER STATION

CROSS-REFERENCE TO RELATED APPLICATIONS

This application claims priority to and the benefit of U.S. Provisional Patent Application Ser. No. 61/587,486, filed Jan. 17, 2012 and entitled "Systems and Methods for Transmitting Data from an Underwater Vehicle," the entire contents of each of which are incorporated herein by reference.

BACKGROUND

There is an increasing need for observations by ocean systems. Underwater systems (such as underwater vehicles) observing and collecting data beneath the ocean surface need to communicate or offload this data to surface locations or above-surface sites (e.g., platforms, ships, satellites). The data acquisition rates for an underwater survey platform or an above-surface site can be on the order of 10 megabytes per second. However, current underwater communication systems are generally very slow. These underwater communication systems communicate using either radio waves or acoustic signals. Radio waves have very poor penetration underwater, except at extremely low frequencies, thereby limiting bandwidths and data rates. Acoustic modems have modest data rates at even short ranges. However, at long ranges and lower frequencies the data rates of acoustic modems can drop below 1 kilobit/s.

One technique for offloading data is to allow the underwater device to reach the surface and then communicate with other above-surface sites using radio waves. Another technique is to connect the underwater device to a docking port also located underwater, whereby the docking port is connected to the surface via a tether. Another technique is to recover the underwater device and directly download the collected data.

However, these techniques have limitations. None of them work effectively while the vehicle is underway and underwater. Radio communications can achieve reasonable data rates when line of sight is available and the antenna is not being washed over by waves (a fairly significant problem for small vehicles). Underwater docks don't require the vehicle to surface but require infrastructure that is not typically available in unexplored areas. Recovering the vehicle is slow, cumbersome, and requires a ship in the general proximity of the vehicle. What is needed is a way to remotely get large amounts of data from a vehicle back to a ship or shore.

SUMMARY

Generally, the systems and methods described herein include releasable storage devices that can surface with data. The devices include data storage, an antenna, battery and means to propel the device to the surface or into the atmosphere. The systems and methods disclosed herein have multiple parts and can occur in multiple stages. Generally it may be a releasable storage device that can surface with data. In certain embodiments, it is a USB memory stick, a battery, suitable buoyancy, and an antenna.

In certain embodiments, the systems and methods described herein include a rocket to boost the system out of the water to a higher altitude. The rocket may or may not fire underwater, and the system may or may not be supercavitating while underwater. Once the system is airborne, it can transmit data to a ship or satellite via radio communications, via other line of site methods such as optical, or may be captured by an aircraft such as a UAV. It may deploy an antenna. It may deploy a parachute or streamer to slow its descent after the rocket is exhausted. The rocket may also fly to a waiting ship or shore location, and may deploy wings to increase its range.

The system can use a pressure housing to protect its electronics, it may pot the electronics in some material, or it may pressure compensate the electronics. In certain implementations, the pressure compensation fluid may double as fuel for the rocket.

More particularly, in certain aspects, the systems and methods described herein include systems for communicating data from an underwater location to a surface location. The systems may include a capsule having a communication interface and a data storage unit for receiving and communicating data from an underwater station at an underwater location. The capsule may be configured to couple with the underwater station when receiving the data, and decouple from the station and float to a first surface location when communicating the data. The systems may include a propulsion unit coupled to the capsule for propelling the capsule into the atmosphere to a height above the first surface location to establish a communication link between the capsule and a second surface location. The data storage unit may include a universal serial bus (USB) key device.

In certain embodiments, the capsule includes one or more buoyancy materials selected to cause the capsule to become positively buoyant. In such embodiments, the propulsion unit includes one or more propellant materials. The one or more propellant materials may be the same as the one or more buoyancy materials including syntactic wax having a matrix of wax impregnated with a plurality of microspheres. The syntactic wax may combust when ignited in the propulsion unit.

In certain embodiments, the capsule includes one or more pressure compensating materials. In such embodiments, the propulsion unit includes one or more propellant materials and the one or more propellant materials may be the same as the one or more buoyancy materials. The one or more pressure compensating material may include oil. The data storage unit may be submerged in the one or more pressure compensating materials.

In certain embodiments, the capsule includes a power unit having a rechargeable battery for providing electrical power to the communication interface and the data storage unit. The power unit may include inductive charging elements to allow the capsule to inductively charge the battery when in close proximity to the underwater station.

In certain embodiments, the communication interface includes a wireless transceiver. The height above the first surface location may be selected such that the communication link is a line-of-sight communication link. The capsule may include one or more antennas for communicating across distances beyond a horizon in relation to the capsule. In certain embodiments, an effective data rate for communicating at least 50 MB between the underwater location at a depth of about 1000 m and the second surface location is at least 50 Kbps.

In certain aspects, the systems and methods described herein include methods for communicating data from an underwater location to a surface location. The methods may include receiving, at a submerged data capsule, a data payload from an underwater station, wherein the data capsule includes a communication interface and a data storage unit, and is attached to the underwater station. The methods may also include detaching the data capsule from the underwater station, and allowing the submerged data capsule to ascend to the surface, and communicating, using the communication interface, the data payload to one or more surface locations. The method may include generating electrical power from surface waves at the surface location. The method may include communicating the data payload while underwater by retrieving the capsule underwater as the capsule ascends to the surface.

In certain embodiments, the capsule includes a propulsion unit, and the method further comprises propelling the capsule into the atmosphere to a height above the surface location. In such an embodiment, the method may include communicating the data payload while airborne and/or deploying a parachute mechanism and retrieving the capsule mid-air while the capsule descends on parachute. In certain embodiments, the capsule includes buoyancy material that is configured to also be used for propulsion, and the method further comprises igniting the buoyancy material when the capsule has ascended to a location near the surface. The capsule may include pressure compensating material that is configured to also be used for propulsion, and the method may further comprise igniting the pressure compensating material when the capsule has ascended to a location near the surface.

In certain embodiments, the methods may further comprise determining a location of the data capsule using at least one of a passive localization technique or an active localization technique. In such embodiments, determining the location includes determining a course for the data capsule based on a signal received from the surface location.

In certain aspects, the systems and methods described herein may include systems for communicating data from an underwater location to a surface location. The systems may include a capsule having a communication interface and a data storage unit for receiving and communicating data from an underwater station at an underwater location. The capsule may be configured to couple with the underwater station when receiving the data, and decouple from the station and float to a first surface location when communicating the data. The systems may include a power generation unit coupled to the capsule for generating electrical power from surface waves at the first surface location. The communication interface may be configured to establish a communication link between the capsule and a second surface location.

In certain aspects, the systems and methods described herein may include systems for communicating data from an underwater location to a surface location. The systems may include a capsule having a radio transceiver and a data storage unit for receiving and communicating data from an underwater station at an underwater location at 1000 m below sea level. The capsule may be configured to couple with the underwater station when receiving the data, and decouple from the underwater station and float to a first surface location when communicating the data. In certain embodiments, when at the first surface location, the transceiver is configured to establish a communication link to a second surface location. A data rate for communicating at least 50 MB between the underwater location and the second surface location is at least 50 Kbps. In some implementations, the data rate may be greater than 1 Mbps.

In certain aspects, the systems and methods described herein may include systems for communicating data from an underwater location to a surface location. The systems may include a capsule having a communication unit and a data storage unit for receiving and communicating a data payload from an underwater station at an underwater location. The capsule may be configured to couple with the underwater station when receiving the data payload, and decouple from the underwater station and float to a first surface location when communicating the data payload. In certain embodiments, when at the first surface location, the communication unit is configured to establish a communication link and transmit the data payload to a second surface location. A data rate for communicating the data payload between the underwater location and the second surface location may increase linearly with a size of the data payload.

BRIEF DESCRIPTION OF THE DRAWINGS

The foregoing and other objects, features, advantages, and illustrative embodiments of the invention will now be described with reference to drawings in which like reference designations refer to the same parts throughout the different views. These drawings are not necessarily to scale, emphasis instead being placed upon illustrating principles of the embodiments.

FIGS. 3A-3D depict data capsules for transmitting data from an underwater station to a surface location, according to an illustrative embodiment of the present disclosure.

DETAILED DESCRIPTION

To provide an overall understanding of the systems and methods described herein, certain illustrative embodiments will now be described, including systems and methods for transmitting data from an underwater location. However, it will be understood by one of ordinary skill in the art that the systems and methods described herein may be adapted and modified for other suitable applications and that such other additions and modifications will not depart from the scope thereof.

The systems and methods described herein include releasable storage devices that can surface with data. The devices include data storage, an antenna, battery and means to propel the device to the surface or into the atmosphere. The systems and methods disclosed herein have multiple parts and can occur in multiple stages. Generally it may be a releasable storage device that can surface with data. In certain embodiments, it is a USB memory stick, a battery, suitable buoyancy, and an antenna. In certain embodiments, the systems and methods described herein include a rocket to boost the system out of the water to a higher altitude. Once the system is airborne, it can transmit data to a ship or satellite via radio communications, via other line of site methods such as optical, or may be captured by an aircraft such as a UAV. It may deploy an antenna. It may deploy a parachute or streamer to slow its descent after the rocket is exhausted. The rocket may also fly to a waiting ship or shore location, and may deploy wings to increase its range.

Figure 1:
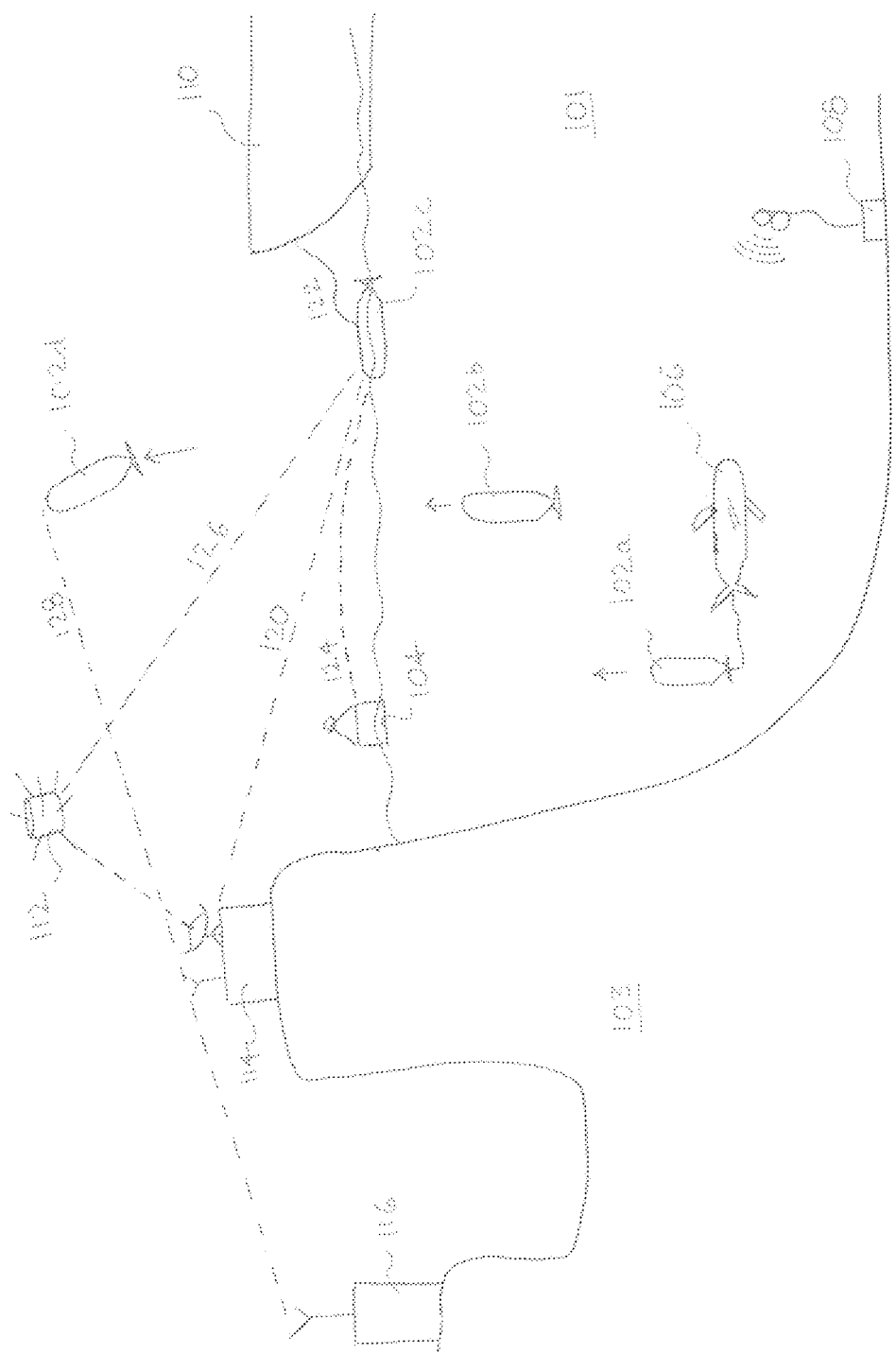
FIG. 1 is a high-level diagram depicting data transmission between an underwater station (e.g., AUV) and a surface location, according to an illustrative embodiment of the present disclosure.

FIG. 1 is a high-level diagram depicting data transmission between one or more underwater stations and one or more surface locations, according to an illustrative embodiment of the present disclosure. In particular, it may be desirable to transmit information and data collected by underwater stations 106 and 108, such as submerged sensors, underwater vehicles, subsea observatories, and the like, to surface locations 110, 114, 116 and/or 124. An underwater vehicle may include an unmanned, untethered underwater vehicle such as an Unmanned Undersea Vehicle ("UUV") and an Autonomous Underwater Vehicle ("AUV"), and an unmanned, tethered underwater vehicle such as a Remotely Operated Underwater Vehicle ("ROV"). With advances in sensing technologies, these underwater stations are increasingly being equipped with a broad range of cutting-edge sensing technologies such as underwater vision, and synthetic aperture sonar (SAS). Underwater stations equipped with such advanced sensing technologies generate large amounts of data that need to be transmitted to other locations (e.g., surface station) so as to allow for supervisory control of these underwater stations. One example is the use of realtime video that may serve as an enabling technology for remote intervention with autonomous assets. Applicants have recognized that technologies such as realtime video and SAS produce data at rates that will overwhelm a commercial underwater acoustic modem's data transfer capacity.

Table 1 below shows currently available acoustic modem technologies for transmitting data from an underwater station.

TABLE 1

| Manufacturer | Model | (bps) Minimum Bit-Rate | (bps) Maximum Bit-Rate |
|---|---|---|---|
| Teledyne Benthos | TeleSonar | 360 | 15,360 |
| LinkQuest | UWM | 80 | 38,400 |
| Sercel | MATS | 20 | 26,500 |
| WHOI/Hydroid | MicroModem | 80 | 5,400 |
| EvoLogics | S2C | unspecified | 6500-33,300 |

In one example, video taken at 1024×768 pixels with 16 bit color depth at 6 frames per second produces data at about 9.44 MB/s before any compression scheme is typically factored in. Therefore, a five second video of the seabed will generate almost 50 MB (47.19) of data. If we assume that the data stream can be compressed by 50% without loss of resolution, then a sustained 38400 bps UAM transfer (e.g., using a LinkQuest modem described in Table 1) would take about 2.7 hours to transfer this five second clip. Maintaining and repeating a sustained and reliable data rate for 2.7 hours or any suitable length of time is extremely difficult. The underwater channel typically corrupts such transfers and forces resends, thus reducing the duty cycle and effective baud rate. Also, the transmitter/receiver pair would have to remain in alignment for the duration of the transfer, and ideally are co-located in the vertical plane; horizontal transmission with this sustained data rate over distances greater than several hundred meters is unlikely.

As noted earlier, underwater technologies may be equipped with SAS and other advanced sensing technologies. When considering a technology like SAS, the bandwidth requirements are typically quite daunting: imagery of the seabed is produced at rates in excess of 70 GB/hr. Efficiency may be achieved through processing the sonar imagery in realtime aboard the underwater station during a mission. However, applicants have recognized that it is still the case that even if the data is reduced to digestable aspects from a computer automated detection and classification algorithm (CAD/CAC), the information content still exceeds the practical utility of using an underwater station to offload that information to the surface while the vehicle is underway.

Applicants have recognized that a solution to the above mentioned problem may, as shown in FIG. 1, be to offload the data in a payload capsule that floats to the surface and may be retrieved. Analogous to batch processing, the vehicle may transfer a batch of its large data payload to the capsule's solid state harddrive or a spinning platter hard drive via the communications umbilical, and then schedule the capsule for release. Upon release, the capsule may drop its counterbalance to become positively buoyant, begin its ascent towards the sea surface achieving a modest velocity in transit. Once on the surface, the capsule may be recovered and data may be offloaded to a topside data repository through a wireless link.

As shown in the high-level depiction of FIG. 1, AUV 106 may be submerged and equipped to collect and transfer data to a data capsule 102a. FIG. 1 also depicts data capsule 102b, which is shown to be in transit to the surface. The data capsule 102b may be configured to be positively buoyant and therefore float to the surface. Data capsule 102c is shown floating on the surface of the water 101. When at the surface, data capsule 102c may be configured to transmit data stored in one or more of several different ways. In one way, the data capsule 102c may be recovered by a nearby vessel 110 and the data payload may be off-loaded by a hard wired connection to computer systems aboard the vessel. The data capsule 102c may also be configured with suitable communication interface components such as modems to wirelessly transmit data to remote locations. In one example, the data capsule 102c may communicate via wireless link 124 to a floating buoy and/or to a land station 114 via link 120. Floating data capsule 102c may also communicate with land station 114 via satellite link 126. As depicted in FIG. 1, data capsule 102d may include a rocket to boost the capsule out of the water to a higher altitude.

Once the capsule 102d is airborne, it can transmit data to a land station 116, ship or satellite via radio communications, via other line of site methods such as optical, or may be captured by an aircraft such as a UAV. By gaining altitude, data capsule 102d can communicate with targets that may otherwise be out of sight from the surface. Data capsule 102d may deploy a parachute or streamer to slow its descent after the rocket is exhausted. The data capsule 102d may also fly to a waiting ship or shore location, and may deploy wings to increase its range.

In certain implementations, the data rate for data transmitted from an underwater location to a surface location depends on the size of the data payload and also the time taken for the data capsule to float to the surface. Not to be bound by theory, but as shown in equations (1) and (2) below, for a given displacement, the transit to the surface from a particular depth remains generally constant (assuming no down seep currents).

$$R_D = \frac{D}{T} \quad (1)$$

$$T = T_t + T_o \quad (2)$$

Where, $R_D$ is the effective Data Rate (EDR), in megabytes per second (MB/s), D the data payload size in megabytes (MB), T the total duration in seconds (s), $T_o$ the time it takes to offload the data over the wireless link, in seconds (s), and $T_t$ the time it takes the data capsule to transit from a particular depth.

Figure 2:
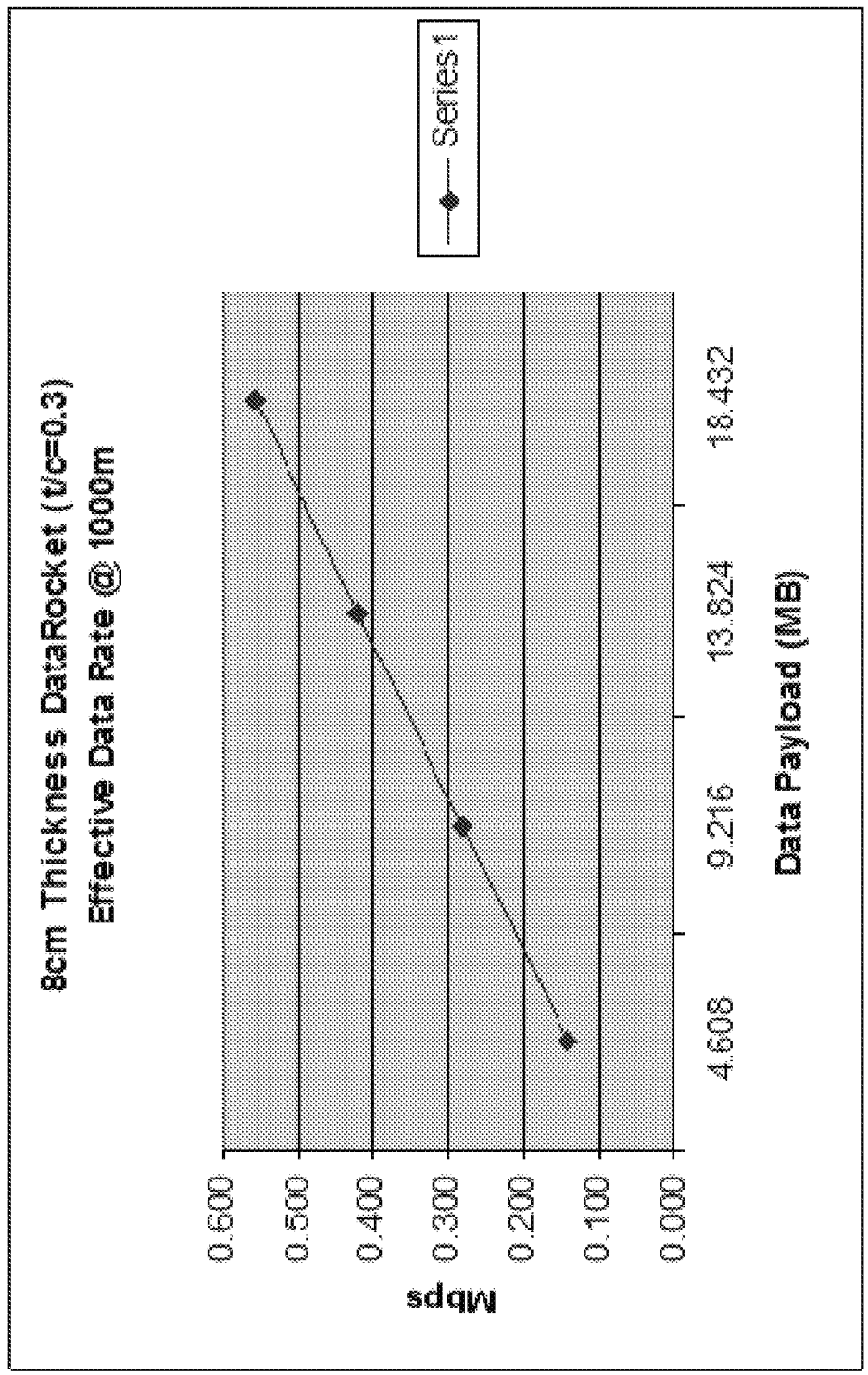
FIG. 2 is a graph depicting the relationship between the data payload size and the data rate, according to an illustrative embodiment of the present disclosure.

For transit from a given depth, $T_t$ is generally constant. So, the data payload, D, can increase in size, but the mitigating factor, $T_o$, does not increase significantly so as to alter the order of the denominator; the offload rate represented by $T_o$ is typically in Mbps. Thus, the effective data rate increases almost linearly with the payload size, D, as shown in FIG. 2. FIG. 2 is a graph depicting the relationship between the data payload size and the data rate, according to an illustrative embodiment of the present disclosure.

Using the graph of FIG. 2, consider one example of a data payload of about 5 seconds of 1024×768×16 bpp video data being transferred from an inspection class AUV operating at about 1000 m depth. Using a data capsule as described herein with a diameter of about 8 cm that displaces roughly 500 mL, a terminal velocity of 3.8 m/s is achieved, resulting in a $T_t$ of 260.94 s. (the initial time to achieve the velocity is negligible). Using a half duplex wireless 100 Base-TX link to offload the data, $T_o$ of 6.99 s is achieved. Thus, the EDR is calculated per equations (1) and (2), as shown in (3) below:

$$R_D = \frac{47.19 \text{ MB}}{6.99 \text{ s} + 260.94 \text{ s}} = 1.41 \text{ Mbps} \quad (3)$$

Thus, the systems and methods described herein can achieve data rates that are at least an order of magnitude greater than the fastest currently available acoustic modems. With an effective data rate of about 1.41 Mbps, the systems and methods described herein are about 37 times faster than the LinkQuest Acoustic modem described with reference to Table 1.

Figure 3C:
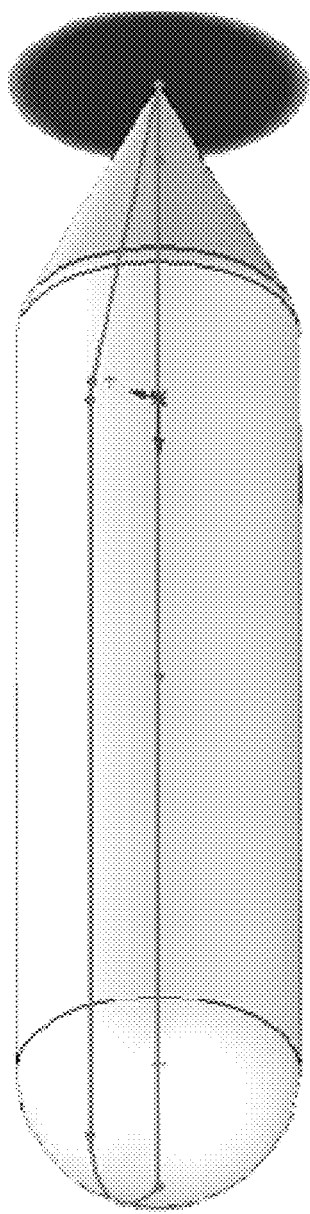

FIGS. 3A-3D depict exemplary data capsules for transmitting data from an underwater station to a surface location. FIG. 3A depicts a data capsule 302a that can be submersed under water and be attached to an underwater station. The data capsule 302a may include one or more data storage devices 310 for storing a data payload obtained from the underwater station, and suitable electronics to communicate the data payload to a surface location. The data capsule 302a may have a variety of shapes, sizes, and configurations. In certain implementations, the data capsule 302a may be sized and shaped to reduce hydrodynamic drag and may include one or more fins or wings to improve hydrodynamic properties. In certain implementations, the data capsule 302a may be sized and shaped and include one or more other components (e.g., vertical stabilizers mounted on wings) to improve aerodynamic properties and/or allow the structural surfaces to serve as noise shielding barriers that may effectively block or redirect the noise, infrared radiation, or both directed towards the ground from the data capsule in flight. As illustrated, the capsule 302a includes an elongate body or housing 304 including a propellant chamber 306, an electronics chamber 308, and a buoyancy and floatation chamber 312. The propellant chamber 306 includes one or more components, e.g., rocket propellant, for propelling the data capsule 302a through water and/or air. The electronics chamber 308 includes several components for storing and transmitting data, for controlling the operation of the data capsule 302a and for powering the data capsule 302a. The buoyancy and floatation chamber 312 includes one or more components for providing positive buoyancy and/or negative buoyancy to the data capsule 302a to allow the data capsule to float to the surface when detached from the underwater station. Each of the chambers 306, 308 and 312 can have any size and shape and can be located anywhere in the data capsule 302a. As illustrated, the chambers 306, 308 and 312 are longitudinally arranged along the data capsule 302a. Each of these chambers may be integrally formed together in a single housing or may be removably coupled together using any suitable attachment mechanism.

Figure 3D:
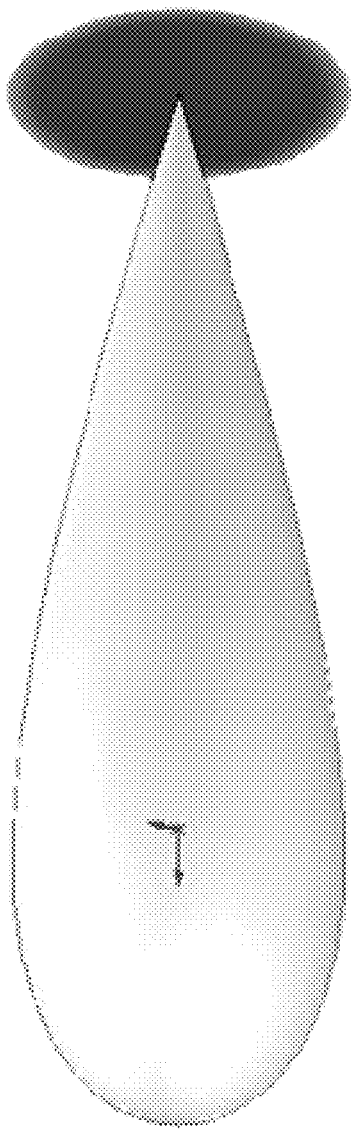

The capsule 302a and housing 304 may have substantially cylindrical shape with a substantially constant circular cross-sectional shape along a middle longitudinal length thereof as shown. Generally, the capsule 302a and housing 304 may be sized and shaped as desired without departing from the scope of the invention. The head end and/or tail end of the capsule may taper distally, e.g., be rounded, cone-shaped, truncated cone-shaped, etc., to help improve hydrodynamics of the capsule 302a. FIGS. 3C and 3D depict three-dimensional renderings of two capsules having differing shapes, according an illustrative embodiment of the present disclosure.

The housing 304 includes a waterproof enclosure and helps prevent damage to the internal components from water. In one embodiment, the housing 304 may be formed from suitable waterproof or water impermeable material. In particular, the water proof material may be formed from fine polyester/nylon blends, rubber or plastic, hydrophobic material or other non-porous materials and may include suitable sealants. The housing 304 may include at least one layer of NEOPRENE® or polyurethane. In other embodiments, the housing 304 may be formed by coating a layer of waterproof material on a non-waterproof material. The housing 304 may also have one or more layers of material that may be impermeable to other liquids and gases. The housing 304 may also have of one or more layers of material that may be resistant to high temperature and pressure (e.g., high-temperature in equatorial operating locations, and high pressure at ocean depths of greater than 300 m). The housing 304 and capsule 302a in general may have a depth rating of at least 1000 m. In certain implementations, the housing 304 and capsule 302a may have a depth rating of greater than 1500 m. In certain implementations, the housing 304 and capsule 302a may have a depth rating between 1500 m and 6000 m. In other implementations, the housing 304 and capsule 302a may have a depth rating of greater than 6000 m. In other embodiments, the housing 304 may comprise of one or more layers of material that may be resistant to corrosive and abrasive substances. In still other embodiments, the housing 304 may comprise of one or more layers of material that may be resistant to abuse from wildlife. In certain embodiments, a portion of the housing 304 may be formed from a transparent material to allow light rays to pass through. The housing 304 substantially prevents environmental damage to the components of the data capsule 302a and its various internal components including the sensitive electronic circuitry. In certain embodiments, the housing 304 is adapted to for atmospheric or subsurface applications. In such embodiments, the housing 304 includes light materials configured to tolerate atmospheric and near atmospheric pressures. Generally, this housing 304 may include a structure designed to protect an electrical or electronic component from external pressure or exposure to substances. The housing 304 may be is designed to support external hydrostatic pressure or other forces which would otherwise adversely affect the integrity or operation of the contained electrical component. The housing 304 may be sealed against the intrusion of liquids or gasses by conventional methods possibly including but not limited to o-rings, gaskets, glues, or mechanical interference press fits between parts.

In certain implementations, the buoyancy chamber 312 includes one or more buoyancy mechanisms such as a lift bag, a balloon, or other expandable member that can be contained in an unexpanded or non-deployed position at least partially inside the chamber 312 and that can be inflated with a fluid or otherwise expanded to increase a buoyancy of the capsule 302a. Sometimes, the data capsule 302a may be neutrally buoyant, making it prone to becoming easily trapped or stuck underwater as they have very little upward force due to buoyancy. The capsule 302a attached to a neutrally buoyant underwater station may also be neutrally buoyant and hydrodynamic, but it can be configured to increase its buoyancy upon deployment of the buoyancy mechanism. The buoyancy mechanism may have any size, shape, and configuration, and may be configured to provide any amount of buoyancy force when in an expanded or deployed position, although the buoyancy force provided by an expanded buoyancy mechanism is preferably at least enough to pull the capsule 302a alone and/or the capsule 302a with an underwater station attached thereto from underwater to the water surface. In certain implementations, the buoyancy mechanism is brightly colored, e.g., fluorescent, safety orange, etc., and/or have reflective properties to help improve visibility of the buoyancy mechanism from a distance.

The buoyancy chamber 312 may include any suitable buoyancy material that provides sufficient buoyancy while being resistant to compressive hydrostatic pressure at great depths. In certain implementations, the buoyancy material in data capsule 302a may include syntactic foam materials. Syntactic foam is typically a composite material in which lightweight particles are bonded together in a matrix of high-strength resin. For buoyancy purposes, the lightweight particles are usually microspheres, typically glass bubbles, or macrospheres, typically larger plastic bubbles. The resins concerned are typically thermoset materials, and a catalyst may be used in the mixing process to cause crosslinking. In certain implementations, liquid buoyancy materials may be used with data capsule 302a. In particular, liquid buoyancy materials may be advantageous because they are typically re-usable, can easily be positioned within hollow structures of the data capsule 302a, are virtually imcompressible, and have a high resistance to compressive forces.

In certain implementations, the propellant chamber 306 may include at least one propellant contained within at least one propellant container within the propellant chamber 306. Any fluid or solid propellant can be used, e.g., a gas such as carbon dioxide, a refrigerant such as R134a (tetrafluoroethane), and an explosive powder. In certain implementations, when propulsion may be desired prior to reaching the surface, R134a may be particularly effective in relatively shallow water (up to about 200 feet or about 60 m) because it has a lower vapor pressure compared to carbon dioxide, while carbon dioxide can be particularly effective in deep water (up to about 2000 feet or about 600 m). Explosive powder can be particularly effective at very deep depths (over about 2000 feet). The propellant chamber 306 preferably has one propellant loaded therein, but the propellant chamber 306 can be configured to contain a plurality of propellants that can be selectively deployed at different depths depending on the propellant's effectiveness at the depth of the capsule 302a. In certain implementations, the propellant chamber 306 may include a rocket engine such as an Estes D/E class thrust rocket manufactured by Estes Industries, located in Penrose, Colo., U.S.A. In certain implementations, the propellant used in the propellant chamber 306 may include materials used for other purposes within the data capsule. For example, oil used in insulating and pressure compensating the electronics chamber 308 may be used as rocket propellant when the data capsule 302a is on or near the surface of the water. As another example, certain materials used to maintain positive buoyancy of the data capsule may be used as rocket propellant in the propellant chamber 306. Generally, the propellant chamber 306 may include any suitable materials, propellants and components required for propelling the data capsule 302a above the surface of water and up to a desired altitude. In certain implementations, as depicted in FIG. 3B, the data capsule 302b may be similar to 302a in one or more respects, except that data capsule 302b may not include a propellant chamber 306. Data capsule 302b, unlike data capsule 302a, may be configured to float to the surface and not necessarily become airborne. Data may be retrieved from data capsule 302b from the surface using wired or wireless links as described with reference to FIG. 1.

As noted above, the materials used to propel the data capsule 302a, may also be used for other purposes. In one example, applicants have recognized that materials such as syntactic wax have multiple purposes of serving as a buoyancy material, a rocket propellant, and a pressure compensator. Such materials may be constituted by a large number of hollow spheres supported in a matrix of an incompressible non-thermosetting material of low specific gravity (i.e., less than sea water). The matrix material may be oil or a material solid at normal temperatures, but which can easily be liquefied to enable the material to be re-used such as a paraffin wax or a thermoplastic material. The spheres or microspheres may be any suitable size and may be of varying sizes cross the matrix and the ratio of the matrix material to the microspheres may be any suitable ratio. Materials such as syntactic wax may have a dual purpose in that they may be used both as buoyancy material and as a rocket propellant. In certain implementations, blowing oxygen past a melted surface of paraffin wax causes droplets of paraffin to whip up above the surface. These droplets can then be combusted in the presence of pure oxygen and thereby serve as rocket propellant. The data capsule 302a may include syntactic wax materials that serve as buoyancy material until the data capsule 302a reaches the surface and then serve as rocket propellant to allow the data capsule 302a to become airborne. Such dual-use materials may be advantageous in at least that they help reduce the weight of the data capsule 302a.

Data may be stored in the electronics chamber 308 of the data capsule 302a. The electronics chamber 308 may include several electrical and electronic components for storing data, receiving data from an underwater station, transmitting data to a surface location, controlling the components in the buoyancy chamber 312, controlling the components in the propellant chamber 306 and generally controlling mechanical components such as latches, couplings, glider wings, and the like. One exemplary implementation of the electronics chamber 308 is described in more detail below with reference to FIG. 4.

Figure 4:
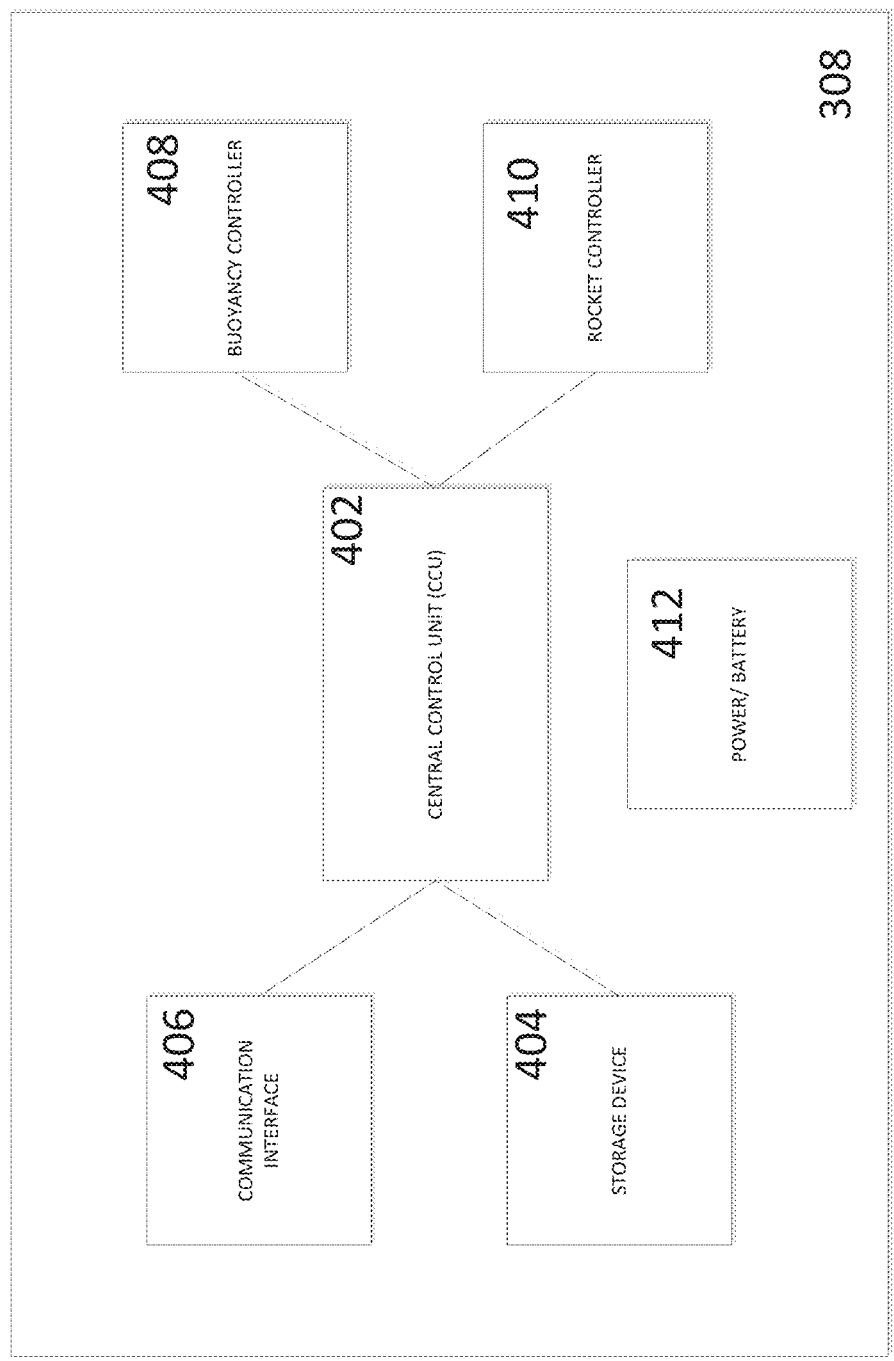
FIG. 4 depicts an electronics module in the data capsule of FIGS. 3A-3D, according to an illustrative embodiment of the present disclosure.

FIG. 4 is a block diagram depicting the various components in the electronics chamber 308 in the data capsule of FIGS. 3A and 3B, according to an illustrative embodiment of the present disclosure. The electronics chamber 308 includes a data storage device 404 for storing data payloads received from one or more underwater stations and a communications interface 406 for establishing communication links with the one or more underwater stations and one or more surface locations. The electronics chamber 308 allows for data to be received from an underwater station, stored therein during transit up to the surface and then extracted to a desired surface location. The electronics chamber 308 also includes additional components to be used to control the movement of the data capsule. In particular, the electronics chamber 308 includes a buoyancy controller 408 for controlling the deployment and in some cases the release of, of one or more buoyancy devices such as a counterweight in the buoyancy chamber 312. The electronics chamber 308 also includes a rocket controller 410 for controlling the ignition of the rocket propellant in the propellant chamber 306. The electronics chamber 308 further includes a central control unit (CCU), which may serve to control and coordinate the operation of each of the components in the electronics chamber 308. The components in the electronic chamber 308 may receive power from the power unit 412.

The data storage device 404 may include a suitable storage device including flash memory, RAM memory, and means for permanent data storage, such as a hard drive. Data storage device 404 may also include other mass storage devices such as disk and tape drives. In one implementation, the data storage device includes a universal serial bus (USB) key flash drive or micro drive devices. In certain embodiments, the data storage device 404 may be configured to store about 1 GB of data. Generally, the data storage device 404 may be configured to store larger or smaller amounts of data as desired for a particular application. In one example, the data storage device 404 may be configured to store up to 64 GB of data. In another example, the data storage device 404 may be configured to store greater and 64 GB and up to 1 TB of data. The data storage device 404 may be configured to store greater than 1 TB of data.

The communications interface 406 may include circuitry for establishing one or more communication links between the data capsule and an underwater station and a surface location. The communication interface may be a modem, an Ethernet card or any other suitable data communications device. The data interface may provide a relatively high-speed link to an underwater station, a surface location or any other network, such as an intranet, internet, or the Internet, either directly or through another external interface. The communication link may be, for example, any suitable link such as an optical, wired, or wireless (e.g., via radio or satellite or 802.11 Wi-Fi or cellular network) link. The communication interface 406 may be connected to one or more antennas, which in turn may be flexible or fixed.

The central control unit (CCU) 402 serves as a hub for controlling the upload, storage and transmission of a data payload from an underwater station to a surface location via the data capsule. The CCU 402 also serves as a hub for controlling the operation of the data capsule, itself, including operating the buoyancy and the rocket propulsion devices. The CCU 402 may be any general purpose computer including but not limited to a single-board computer (SBC) or a multi-board computer configured with instructions for performing various functions. Generally, the CCU 402 may include a processor, a memory, and an interconnect bus. The processor may include a single microprocessor or microcontroller or a plurality of microprocessors or microcontrollers for configuring the CCU 402 as a multi-processor system. The memory includes a main memory and a read-only memory. The main memory may also include dynamic random access memory (DRAM) and high-speed cache memory. In operation and use, the main memory stores at least portions of instructions for execution by the processor when processing data stored in main memory.

The CCU 402 and other components in the electronics chamber 308 may be powered in any number of ways. In certain implementations, the electronics chamber 308 is externally powered by being in electronic communication with an underwater station attached to the capsule, and receive power from the underwater station. In such an implementation, the capsule may be detachably hardwired to the underwater station to receive power. The power received from the underwater station may be used to power the electronics chamber 308 and/or also charge or recharge an on board battery 412. For example, the battery may include an internal power source, e.g., a DC battery (such as a non-volatile or Li ion battery) providing a voltage in a range of about 3 to 30 volts. In certain implementations, the capsule may not be hardwired to the underwater station, but instead be inductively coupled to the underwater station. In such an implementation, the capsule may be able to charge its battery and/or power its electronics chamber 308 by inductively coupling with the underwater station. In certain implementations, the data capsule may include a generator to harness the power of surface waves and charge its power unit/battery 412 when the data capsule 302$a$ is on or near the surface. In such an implementation, the generator may include one or more pistons and may capture the energy in the rise and fall motion of waves. Such a generator is particularly useful when the data capsule 302$a$ was attached to a deep sea mooring for an extended period of time and now requires a recharge upon rising to the surface. The generator may include any suitable type of generator capture method including but not limited to at least one of point absorber or buoy, surfacing following or attenuator oriented parallel to the direction of wave propagation, terminator, oriented perpendicular to the direction of wave propagation, oscillating water column, and overtopping. The generator may include at least one of power take-off systems including hydraulic ram, elastomeric hose pump, pump-to-shore, hydroelectric turbine, air turbine, gyroscopic, and linear electrical generator. In certain implementations, the data capsule may include a generator to charge its power unit/ battery 412 that converts kinetic energy to electrical energy as the data capsule 302$a$ rises to the surface.

The electronics chamber 308 and the data capsule, in general, may include one or more devices that protect an electrical or electronic component from external pressure or exposure to substances, e.g., an oil compensated battery. In some embodiments, the device includes a housing made of both electrical conductors and one or more electrical insulators surrounds one or more electrical components. This structure may be designed to support external hydrostatic pressure or other forces which would otherwise adversely affect the integrity or operation of the contained electrical component. In some embodiments, the device may be sealed against the intrusion of liquids or gases by conventional methods possibly including but not limited to o-rings, gaskets, glues, or mechanical interference press fits between parts. There may also be electrical contact features, whether separate components such as springs or wires, or integral mechanical features of the housing components themselves, which make electrical contact between the terminals of the contained electrical component and the electrically conductive portions of the housing. In one example, the components of the electronic chamber 308 may be stored in a pressure vessel or a non-conducting pressure compensating fluid, such as mineral oil, while underwater. In certain implementations, the pressure compensating fluid may serve other purposes, as well. For example, oil may serve the dual purpose of preventing the electronics from shorting out while underwater, and once the capsule is released, serving as rocket fuel. To conserve space on the data capsule, the electronic components in the electronic chamber 308 may be submerged in a gas tank which can be drained into the propellant chamber 306 for use as a propellant fluid.

Figure 5:
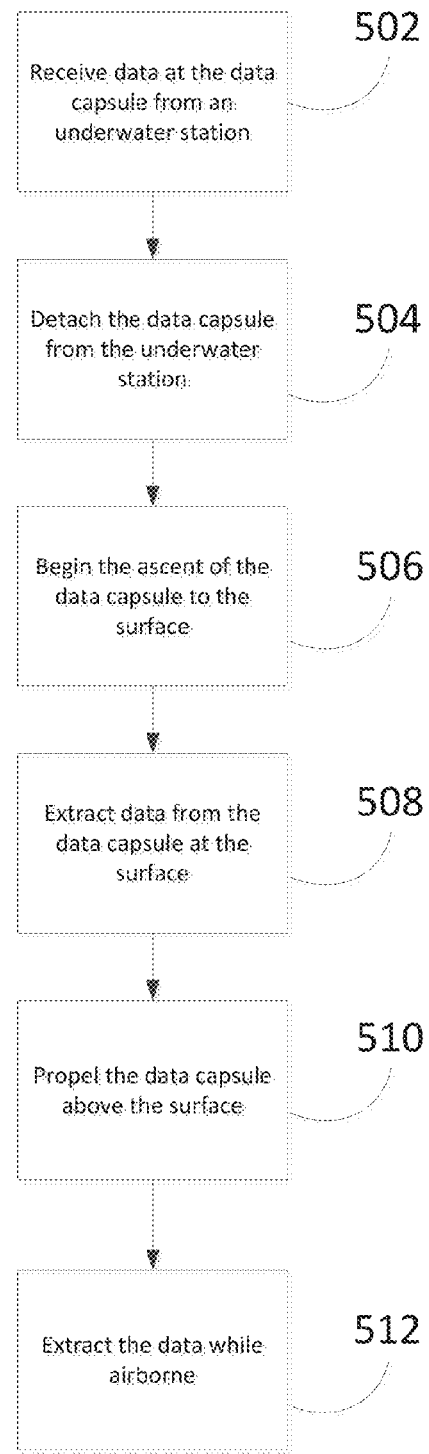
FIG. 5 depicts a process for transmitting data from an underwater location to a surface or land location, according to an illustrative embodiment of the present disclosure.

FIG. 5 depicts a process 500 for transmitting data from an underwater location to a surface or land location using a data capsule as described herein, according to an illustrative embodiment of the present disclosure. The process 500 begins with receiving data from an underwater station (step 502). In particular, when deployed, an underwater station such as an AUV may be used to collect and store data from underwater environments. One or more data capsules (such as those described with reference to FIGS. 1-4) may be connected to the AUV. These data capsules may be attached to the AUV prior to a mission or at a later time during a mission. While connected, either physically or inductively, the data capsule is configured to charge and/or recharge its batteries. The data capsule may also be configured start and/or stop downloading data payloads from the AUV. In particular, either a processor in the AUV or the CCU in the data capsule or both may be configured with computer instructions and communication protocols for conducting the transfer of data from the AUV to the data capsule. The instructions and protocols may include timing, size, and other metrics related to the data payload. In one example, the data capsule may be configured to receive a data payload once the AUV has completed a mission and is about to start a new mission. In such an example, the data payload may be one or more batches of raw data collected from the completed mission. The data payload may also be one or more batches of data collected from the completed mission, that is at least partially processed by the AUV. In another example, the data capsule may be scheduled to receive a data payload at predetermined intervals of time. In such an example the data payload may include one or more batches of raw and/or processed data specific intervals of time. These intervals of time may be predetermined prior to a mission or may be adapted and modified during a mission. In still another example, the data capsule may be configured to receive a data payload from the AUV when requested or queried by a remote operator. In such an example, when the AUV or the data capsule receives a ping or message requesting a data dump, the AUV may transfer all or a portion of stored data to the data capsule. Generally, the data capsule may receive one or more data payloads from an underwater station in any suitable way include any one or more of the above ways in any combination without departing from the scope of the present disclosure. The received one or more data payload may be stored in a storage device (similar to storage device 404 of FIG. 4) on the data capsule.

Once the data capsule has received the one or more data payloads, the data capsule may detach from the underwater station (step 504) and begin floating to the surface (step 506). The data capsule may be configured with suitable latches, connectors and other related release mechanisms that may be electronically controlled for detaching itself from the underwater station. The CCU aboard the data capsule may include instructions for operating the release mechanisms and detaching the data capsule from the underwater station. The CCU and/or one or more processors in the underwater station may be configured with instructions for determining when the data capsule may detach from the underwater station. In one example, the data capsule may detach from the underwater station when one or more data payloads have been received in full. In such an example, the data capsule may queue up the detachment processes prior to the completion of a data download so that when the one or more data payloads have been downloaded, the data capsule can immediately and automatically detach from the underwater station. In another example, the data capsule may detach from the underwater station when a mission has been completed. In yet another example, the data capsule may detach after a certain interval of time has lapsed. In certain implementations when the underwater station is connected with a plurality of data capsules, each data capsule may be configured to detach and release at the same or different times. In still another example, the data capsule and/or underwater station may detach only in response to instructions received from a remote operator. In certain implementations, when the underwater station is operating in harsh environments, the data capsule may detach when a danger for potential data loss or damage is detected. In one example, if power in the underwater station is running low or if the underwater station has sustained damage, the data capsule may be configured to receive stored data and immediately detach from the underwater station.

Once detached, the data capsule may begin its ascent towards the surface (step 506). At the start of the ascent and during the ascent, the CCU aboard the data capsule may be configured to operate one or more buoyancy mechanisms in the buoyancy chamber of the data capsule. In one example, the buoyancy chamber may include one or more positively buoyant materials and one or more counterweights to offset the otherwise positive buoyancy of the data capsule. Once the data capsule detaches from the underwater station or just prior to detaching from the underwater station, the CCU may provide instructions for releasing the one or more counterweights, thereby allowing the data capsule to become positively buoyant and begin its ascent to the surface.

Once the data capsule reaches the surface, the data payload stored therein may be extracted at the surface (step 508). In certain implementations, the data payload may be extracted physically by a nearby ship or vessel. The data capsule may be located on the surface through active localization and/or passive localization. In an active localization technique, the data capsule may send out a ping or wireless message indicating its location (e.g., GPS location) which can then be used by vessels to locate the data capsule. In one example of a passive localization technique, a radio direction finder (RDF) may be used to locate the data capsule. In certain implementations, the data capsule may be recovered through a combination of active and passive location techniques. For example, the retrieving ship or vessel or submarine may transmit a signal (e.g., acoustic signal), which may then be received by the data capsule as it is rising up to the surface or it is already near or at the surface. Once the data capsule receives the signal, the CCU on board the data capsule may provide instructions to adjust the course of the data capsule (e.g., deploy rudders or other physical mechanisms and/or adjust propulsion) towards the transmitting ship or vessel or submarine based on the received signal. In certain implementations, the data capsule may first ping the retrieving ship or vessel or submarine, which in turn transmits its signal based on the ping received from the data capsule.

Upon retrieval, the housing of the data capsule may include a door or access point which may be opened by an operator to extract the storage device within the capsule. The housing may also include one or more ports that allow an operator to connect to the electronics chamber within the data capsule and thereby access the data payload within the data capsule. In certain implementations, once at the surface, the data capsule may transmit the data payload wirelessly to a surface buoy or to a land station. The CCU and the communications interface within the data capsule may establish a wireless link (e.g., radio, WiFi, satellite, optical) and begin transmitting the data payload. In certain implementations, the data capsule may begin transmitting the one or more data payloads immediately upon arriving at the surface. Generally, the data capsule may transmit the data payload at any suitable time as desired. As noted earlier, in certain implementations, the data capsule may include a generator for harnessing ocean waves. In such implementations, once the data capsule nears the surface, the generator may begin capturing energy from the rise and fall of the ocean waves.

In certain implementations, additionally or alternatively to step 508, the data capsule may be propelled above the surface and into the atmosphere (step 510). Data may then be extracted once the data capsule is airborne (step 512). The higher altitude achieved by an airborne data capsule allows for an increased line-of-sight communication range and improved communication quality. In certain implementations, the CCU may provide instructions for when to ignite the rocket propellant in the propellant chamber in the data capsule. In one example, the propellant may be ignited just prior to the data capsule reaching the surface. In another example, the propellant may be ignited once the data capsule reaches the surface. In still another example, the propellant may be ignited while the data capsule is under water and below the surface. As noted above, the data capsule may include certain materials that may serve the dual purpose of serving as rocket propellant and either buoyancy material or pressure compensation and insulation material. In one example in which the buoyancy material is syntactic wax, as the data capsule is approaching the surface, CCU may provide instructions to ignite solid and/or melted portions of this buoyancy material. The ignition may provide sufficient thrust for the data capsule to breach the surface and become airborne. In another example, the electronics in the data capsule may be stored within an oil tank. While underwater, the oil may be used to provide insulation as well as pressure compensation for the electronics. In such an example, as the data capsule is approaching the surface, the CCU may provide instructions for releasing the oil in the tank into the propellant chamber and then igniting the oil. Once ignited, the data capsule may be able to generate sufficient thrust to breach the surface and become airborne.

Once airborne, the data payload may be extracted in any suitable way (step 512). In certain implementations, the CCU and the communications interface may begin transmitting data after a desired interval of time has elapsed. The data capsule may include other devices such as an altimeter or an accelerometer to monitor the capsule's ascent into the atmosphere. The CCU and the communications interface may be programmed to establish a wireless link and transmit the one or more data payload based on the capsule altitude or position. Alternatively, the data capsule may include one or more parachutes and/or gliders which may be configured to deploy at a certain altitude. The data capsule may then be recovered either mid-air by a nearby aircraft or upon landing at a desired location. To accomplish a mid-air retrieval, the nearby aircraft may include a special line suspension system deployed under the aircraft. This suspension system may be used to capture the data capsule as it slowly descends on its parachute. In certain implementations, the data capsule may not include a propulsion system (as in capsule 302*b* of FIG. 3B). In such implementations, the capsule may include one or more balloon mechanisms and suspension lines. Once inflated, the balloons rise and cause the capsule to rise above the sea surface allowing the suspension lines to dangle below. The data capsule may be then be recovered mid-air by a nearby aircraft in a way similar to that described above with reference to the parachuting data capsule. In certain implementations, the data capsule may be recovered using similar techniques while still underwater. For example, the data capsule may be intercepted and recovered by an underwater vehicle having capture system as it floats towards the surface The process described herein may be executed on a conventional data processing platform. Alternatively, the data processing system may comprise a dedicated processing system that includes an embedded programmable data processing unit. For example, the data processing system may comprise a single board computer system.

The process described herein may also be realized as a software component operating on a conventional data processing system. In such an embodiment, the process may be implemented as a computer program written in any of several languages well-known to those of ordinary skill in the art, such as (but not limited to) C, C++, FORTRAN, Java or BASIC.

As noted above, the order in which the steps of the present method are performed is purely illustrative in nature. In fact, the steps can be performed in any order or in parallel, unless otherwise indicated by the present disclosure.

The method of the present disclosure may be performed in either hardware, software, or any combination thereof, as those terms are currently known in the art. In particular, the present method may be carried out by software, firmware, or microcode operating on a computer or computers of any type. Additionally, software embodying the present disclosure may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present disclosure is not limited to any particular platform, unless specifically stated otherwise in the present disclosure.

Variations, modifications, and other implementations of what is described may be employed without departing from the spirit and scope of the invention. More specifically, any of the method, system and device features described above or incorporated by reference may be combined with any other suitable method, system or device features disclosed herein or incorporated by reference, and is within the scope of the contemplated inventions. The invention may be embodied in other specific forms without departing from the spirit or essential characteristics thereof. The forgoing embodiments are therefore to be considered in all respects illustrative, rather than limiting of the invention. The teachings of all references cited herein are hereby incorporated by reference in their entirety.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

The invention claimed is:

1. A system for communicating data from an underwater location to a surface location, comprising:
   a capsule having a communication interface and a data storage unit for receiving and communicating the data from an underwater station at the underwater location, wherein the capsule is configured to attach with the underwater station when receiving the data, and detach from the underwater station and float to a first surface location when transmitting the data, and
   a propulsion unit attached to the capsule for propelling the capsule into the atmosphere to a height above the first surface location to establish a communication link between the capsule and a second surface location, wherein the propulsion unit remains attached to the capsule while propelling the capsule to the height above the first surface location, and
   wherein a data rate for communicating the data between the underwater location and the second surface location increases linearly with a size of the data.

2. The system of claim 1, wherein the capsule further includes one or more buoyancy materials selected to cause the capsule to become positively buoyant.

3. The system of claim 2, wherein the propulsion unit includes one or more propellant materials and wherein the one or more propellant materials are the same as the one or more buoyancy materials.

4. The system of claim 3, wherein the one or more buoyancy materials includes syntactic wax having a matrix of wax impregnated with a plurality of microspheres, and wherein the syntactic wax combusts when ignited in the propulsion unit.

5. The system of claim 1, wherein the capsule further includes one or more pressure compensating materials.

6. The system of claim 5, wherein the propulsion unit includes one or more propellant materials and wherein the one or more propellant materials are the same as one or more buoyancy materials.

7. The system of claim 6, wherein the one or more pressure compensating material includes oil.

8. The system of claim 5, wherein the data storage unit is submerged in the one or more pressure compensating materials.

9. The system of claim 1, wherein the communication interface includes a wireless transceiver.

10. The system of claim 1, wherein the capsule further includes a power unit having a rechargeable battery for providing electrical power to the communication interface and the data storage unit, and wherein the power unit further includes inductive charging elements to allow the capsule to inductively charge the rechargeable battery when in close proximity to the underwater station.

11. The system of claim 1, wherein the height is selected such that the communication link is a line-of-sight communication link.

12. The system of claim 1, wherein the data storage unit includes a universal serial bus (USB) key device.

13. The system of claim 1, wherein the capsule further includes one or more antennas for communicating across distances beyond a horizon in relation to the capsule.

14. The system of claim 1, wherein an effective data rate for communicating between 4.608 MB and 18.432 MB between the underwater location at a depth of about 1000 m and the second surface location is between 140 Kbps and 560 Kbps.

15. A method for communicating data payload from an underwater location to a surface location, comprising:
   receiving, at a submerged data capsule, the data payload from an underwater station, wherein the submerged data capsule includes a communication interface and a data storage unit, and is attached to the underwater station;
   detaching the submerged data capsule from the underwater station, and allowing the submerged data capsule to ascend to a first surface location;
   propelling, using a propulsion unit attached to the submerged data capsule, the submerged data capsule into the atmosphere to a height above the first surface location, wherein the propulsion unit remains attached to the submerged data capsule while propelling the submerged data capsule to the height above the first surface location;
   transmitting, using the communication interface, from the height above the first surface location, the data payload to a second surface location, wherein a data rate for communicating the data payload between the underwater location and the second surface location increases linearly with a size of the data payload, wherein the capsule is detached from the underwater station when transmitting the data payload to the second surface location.

16. The method of claim 15, further comprising generating electrical power from surface waves at the surface location.

17. The method of claim 15, wherein the submerged data capsule further includes a propulsion unit, the method further comprises propelling the submerged data capsule into the atmosphere to the height above the surface location.

18. The method of claim 17, further comprising communicating the data payload while airborne.

19. The method of claim 17, further comprising deploying a parachute mechanism and retrieving the submerged data capsule mid-air while the submerged data capsule descends on parachute.

20. The method of claim 17, wherein the submerged data capsule further includes buoyancy material that is configured to also be used for propulsion, the method further comprising igniting the buoyancy material when the submerged data capsule has ascended to the surface location.

21. The method of claim 17, wherein the submerged data capsule further includes pressure compensating material that is configured to also be used for propulsion, the method further comprising igniting the pressure compensating material when the submerged data capsule has ascended to the surface location.

22. The method of claim 15, further comprising determining a location of the submerged data capsule using at least one of a passive localization technique or an active localization technique.

23. The method claim 22, wherein said determining the location includes determining a course for the submerged data capsule based on a signal received from the surface location.

24. The method of claim 15, further comprising communicating the data payload while under water.

25. The method of claim 24, further comprising retrieving the submerged data capsule underwater while the submerged data capsule ascends to the surface location.

26. A system for communicating data from an underwater location to a surface location, comprising:
   a capsule having a communication interface and a data storage unit for receiving and communicating the data from an underwater station at the underwater location, wherein the capsule is configured to attach with the underwater station when receiving the data, and detach from the underwater station and float to a first surface location when transmitting the data and wherein the capsule is attached to a propulsion unit for propelling the capsule from the first surface location to a height above the first surface location, and the capsule remains attached to the propulsion unit while propelled to the height above the first surface location; and a power generation unit attached to the capsule for generating electrical power from surface waves at the first surface location;

wherein the communication interface is configured to establish a communication link between the capsule and a second surface location, and wherein a data rate for communicating the data between the underwater location and the second surface location increases linearly with a size of the data.

27. A system for communicating data from an underwater location to a surface location, comprising:

a capsule having a radio transceiver and a data storage unit for receiving and communicating the data from underwater station at the underwater location at 1000 m below sea level, wherein the capsule is configured to attach with the underwater station when receiving the data, and detach from the underwater station and float to a first surface location when transmitting the data, wherein the capsule is attached to a propulsion unit for propelling the capsule into the atmosphere to a height above the first surface location, wherein the propulsion unit remains attached to the capsule while propelling the capsule to the height above the first surface location, wherein when at the height above the first surface location, the transceiver is configured to establish a communication link to a second surface location, wherein a data rate for communicating between 4.608 MB and 18.432 MB between the underwater location at a depth of about 1000 m and the second surface location is between 140 Kbps and 560 Kbps, and wherein the data rate increases linearly with a size of the data.

28. A system for communicating a data payload from an underwater location to a surface location, comprising:

a capsule having a communication unit and a data storage unit for receiving and communicating the data payload from an underwater station at the underwater location, wherein the capsule is configured to attach with the underwater station when receiving the data payload, and detach from the underwater station and float to a first surface location when transmitting the data payload, wherein the capsule is attached to a propulsion unit for propelling the capsule into the atmosphere to a height above the first surface location, wherein the propulsion unit remains coupled attached to the capsule while propelling the capsule to the height above the first surface location, wherein when at the height above the first surface location, the communication unit is configured to establish a communication link and transmit the data payload to a second surface location wherein a data rate for communicating the data payload between the underwater location and the second surface location increases linearly with a size of the data payload.

* * * * *

UNITED STATES PATENT AND TRADEMARK OFFICE
CERTIFICATE OF CORRECTION

PATENT NO. : 9,853,744 B2
APPLICATION NO. : 13/744143
DATED : December 26, 2017
INVENTOR(S) : Robert S. Damus et al.

Page 1 of 1

It is certified that error appears in the above-identified patent and that said Letters Patent is hereby corrected as shown below:

In the Claims

In Claim 27, Column 19, Line number 20, after the words "data from" please insert --an--

In Claim 28, Column 20, Line number 22, after the word "remains", delete the word "coupled"

Signed and Sealed this
Twenty-second Day of May, 2018

Andrei Iancu
*Director of the United States Patent and Trademark Office*